(12) United States Patent
Yang (10) Patent No.: US 12,016,009 B2
(45) Date of Patent: Jun. 18, 2024

(54) PDCP DUPLICATION CONFIGURATION METHOD AND TERMINAL DEVICE

(71) Applicant: VIVO MOBILE COMMUNICATION CO., LTD., Guangdong (CN)

(72) Inventor: Xiaodong Yang, Chang'an Dongguan (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 361 days.

(21) Appl. No.: 17/212,916

(22) Filed: Mar. 25, 2021

(65) Prior Publication Data
US 2021/0258987 A1    Aug. 19, 2021

Related U.S. Application Data

(63) Continuation of application No. PCT/CN2019/106676, filed on Sep. 19, 2019.

(30) Foreign Application Priority Data

Sep. 27, 2018 (CN) .......................... 201811133676.2

(51) Int. Cl.
*H04W 72/1263* (2023.01)
*H04W 72/02* (2009.01)
*H04W 72/0453* (2023.01)
*H04W 72/50* (2023.01)
*H04W 80/02* (2009.01)

(52) U.S. Cl.
CPC ....... *H04W 72/1263* (2013.01); *H04W 72/02* (2013.01); *H04W 72/0453* (2013.01); *H04W 72/535* (2023.01); *H04W 80/02* (2013.01)

(58) Field of Classification Search
CPC ............. H04W 72/1263; H04W 72/02; H04W 72/0453; H04W 72/535; H04W 80/02; H04W 76/14; H04W 76/16; H04L 1/1822; H04L 1/08; H04L 1/22
See application file for complete search history.

(56) References Cited

U.S. PATENT DOCUMENTS

2009/0161571 A1    6/2009  Terry et al.
2017/0353883 A1   12/2017  Tenny et al.
(Continued)

FOREIGN PATENT DOCUMENTS

| CN | 105721120 A | 6/2016 |
| EP | 2 640 120 A1 | 9/2013 |
| WO | 2018029537 A1 | 2/2018 |

OTHER PUBLICATIONS

"De-prioritization of duplicated transmission for V2X sidelink communication" 3GPP TSG-RAN WG2 #102, R2-1808588, LG Electronics Inc., May 21, 2018.
(Continued)

*Primary Examiner* — Yu-Wen Chang
(74) *Attorney, Agent, or Firm* — Price Heneveld LLP (57) ABSTRACT

Embodiments of the present invention disclose a PDCP duplication configuration method and a terminal device, to perform PDCP duplication configuration. The method includes: determining, by a terminal device, configuration information of a sidelink SL PDCP duplication; and performing SL PDCP duplication configuration based on the configuration information, to implement PDCP duplication configuration.

16 Claims, 3 Drawing Sheets

(56) References Cited

U.S. PATENT DOCUMENTS

| | | | |
|---|---|---|---|
| 2019/0215685 A1* | 7/2019 | Wang | H04W 80/08 |
| 2019/0239112 A1* | 8/2019 | Rao | H04W 72/20 |
| 2019/0254062 A1* | 8/2019 | Wu | H04W 72/21 |
| 2020/0053699 A1* | 2/2020 | Chen | H04W 72/02 |
| 2020/0059844 A1* | 2/2020 | Lee | H04W 36/06 |
| 2020/0084659 A1* | 3/2020 | Pan | H04W 76/15 |
| 2020/0275303 A1* | 8/2020 | Mok | H04L 1/08 |
| 2020/0403731 A1* | 12/2020 | Zhang | H04W 76/14 |
| 2020/0404625 A1* | 12/2020 | Roth-Mandutz | H04W 76/14 |
| 2021/0006954 A1* | 1/2021 | Xu | H04L 47/767 |
| 2021/0136866 A1* | 5/2021 | Lu | H04L 1/22 |
| 2021/0153065 A1* | 5/2021 | Adjakple | H04W 76/14 |
| 2021/0204301 A1* | 7/2021 | Lee | H04W 72/566 |

OTHER PUBLICATIONS

"Sidelink physical layer structure and procedure for NR V2X" 3GPP TSG RAN WG1 Meeting #94, Huawei, HiSilicon, R1-1808093, Aug. 20, 2018.

"LTE-NR Coexistence" 3GPP TSG RAN WG2 Meeting #97bis, Sony, R2-1703279, Apr. 3, 2017.

JP Office Action in Application No. 2021-517445 Dated Dec. 23, 2022.

EP Search Report in Application No. 19867554.8 dated Oct. 8, 2021.

"Report from [101#72][LTE/V2X] Packet duplication" 3GPP TSG-RAN WG2 #101-Bis, Tdoc R2-1805719, Ericsson (Rapporteur), Apr. 16, 2018.

"Summary of [101bis#84][LTE/V2X]—Discussion on the issues for running RRC CR" 3GPP TSG-RAN WG2 Meeting #102, R2-1807424, Huawei (rapporteur), May 21, 2018.

"Open Issues on Sidelink Packet Duplication" 3GPP TSG-RAN WG2 #102, TDoc R2-1808146, Ericsson, May 21, 2018.

"Introduction of eV2X in TS 36.300" 3GPP TSG-RAN WG2 Meeting #102, R2-1809265, Huawei, HiSilicon, May 21, 2018.

JP Office Action in Application No. 2021-517445 Dated May 30, 2022.

"Discussion on packet duplication in eV2X" 3GPP TSG-RAN WG2 Meeting #99, Samsung, R2-1709006, Aug. 21, 2017.

"Consideration on Data Duplication Design for PC5 CA" 3GPP TSG-RAN WG2 Meeting #100, ZTE, R2-1713071, Nov. 27, 2017.

"Packet duplication indication for PC5" 3GPP TSG-RAN WG2 Meeting #101, vivo, R2-1802005, Feb. 26, 2018.

"Packet Duplication for the Sidelink Carrier Aggregation" 3GPP TSG-RAN WG2 Meeting #101, Samsung, R2-1802599, Feb. 26, 2018.

"Packet duplication detection in sidelink PDCP" 3GPP TSG-RAN WG2 Meeting #101bis, vivo, R2-1804697, Apr. 16, 2018.

"Report from [101#72][LTE/V2X] Packet duplication" 3GPP TSG-RAN WG2 Meeting #101-Bis, Ericsson (Rapporteur), Tdoc R2-1805719, Apr. 16, 2018.

"Summary of [101bis#84][LTE/V2X]—Discussion on the issues for running RRC CR" 3GPP TSG-RAN WG2 Meeting #102, Huawei (rapporteur), R2-1807424, May 21, 2018.

CN Office Action in Application No. 201811133676.2 dated Sep. 24, 2020.

"Packet Duplication at PDCP" 3GPP TSG-RAN WG2 Meeting #97, InterDigital Communications, R2-1701186, Feb. 13, 2017.

"Discussion on duplication in eV2x mode-4" 3GPP TSG-RAN2 Meeting #101bis, Oppo, R2-1804361, Apr. 16, 2018.

"Open issue list for Rel-15 eV2X" 3GPP TSG-RAN WG2 Meeting #101bis, Huawei (Rapporteur), R2-1805763, Apr. 16, 2018.

"TP for TS 36.300 on the usage of PDCP duplication (de)activation MAC CE" 3GPP TSG-RAN WG2 #102 Meeting, Huawei, HiSilicon, R2-1807489, May 21, 2018.

Written Opinion and International Search Report in Application No. PCT/CN2019/106676 dated Apr. 8, 2021.

* cited by examiner

PDCP DUPLICATION CONFIGURATION METHOD AND TERMINAL DEVICE

CROSS-REFERENCE OF RELATED APPLICATION

This application is a continuation of PCT Application No. PCT/CN2019/106676 filed on Sep. 19, 2019, which claims priority to Chinese Patent Application No. 201811133676.2, filed on Sep. 27, 2018 in China, which is incorporated herein by reference in its entirety.

TECHNICAL FIELD

This application relates to the communications field, and in particular, to a packet data convergence protocol (PDCP) duplication configuration method and a terminal device.

BACKGROUND

One of new radio (NR) services is ultra-reliable and low latency communications (URLLC). For the URLLC, because of a relatively high requirement for both a latency and reliability, a current solution in 3GPP is to introduce a PDCP duplication mechanism, that is, a same PDCP protocol data unit (PDU) is transmitted over a plurality of paths, to improve transmission reliability and reduce a transmission latency by multiplexing transmission gains.

The PDCP duplication mechanism is mainly introduced for the URLLC. Currently, there is no solution related to PDCP duplication configuration. Therefore, it is necessary to provide a solution related to the PDCP duplication configuration to perform PDCP duplication configuration.

SUMMARY

Embodiments of the present disclosure aim to provide a PDCP duplication configuration method and a terminal device, to perform PDCP duplication configuration.

According to a first aspect, a PDCP duplication configuration method is provided, and the method includes: determining, by a terminal device, configuration information of a sidelink (SL, or translated into a lateral link, a side link or the like) PDCP duplication; and performing SL PDCP duplication configuration based on the configuration information.

According to a second aspect, a terminal device is provided, including: a determining module, configured to determine configuration information of an SL PDCP duplication; and a configuration module, configured to perform SL PDCP duplication configuration based on the configuration information.

According to a third aspect, a terminal device is provided, and the terminal device includes a processor, a memory, and a computer program that is stored in the memory and that can run on the processor, and when the computer program is executed by the processor, the steps of the PDCP duplication configuration method in the first aspect are implemented.

According to a fourth aspect, a computer-readable storage medium is provided, a computer program is stored in the computer-readable storage medium, and when the computer program is executed by a processor, the steps of the PDCP duplication configuration method in the first aspect are implemented.

According to the PDCP duplication configuration method and the terminal device provided in some embodiments of the present disclosure, the terminal device can determine the configuration information of the SL PDCP duplication, and perform SL PDCP duplication configuration based on the determined configuration information, to improve communication validity.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DESCRIPTION OF EMBODIMENTS

To make the objectives, technical solutions, and advantages of this application clearer, the following clearly and completely describes the technical solutions of this application with reference to the specific embodiments of this application and the corresponding accompanying drawings Apparently, the described embodiments are merely some rather than all of the embodiments of this application. All other embodiments obtained by a person of ordinary skill in the art based on the embodiments of this application without creative efforts shall fall within the protection scope of this application.

It should be understood that the technical solutions in some embodiments of the present disclosure can be applied to various communications systems, such as a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, a LTE frequency division duplex (FDD) system, LTE time division duplex (TDD), a Universal Mobile Telecommunications System (UMTS) or a Worldwide Interoperability for Microwave Access (WiMAX) communications system, a 5G system, or a new radio (NR) system, or a subsequent evolution communications system.

In some embodiments of the present disclosure, a terminal device may include but is not limited to a mobile station (MS), a mobile terminal, a mobile telephone, a user terminal device (User Equipment, UE), a handset, a portable terminal device (portable equipment), a vehicle, and the like. The terminal device may communicate with one or more core networks by using a radio access network (RAN). For example, the terminal device may be a mobile phone (or referred to as a "cellular" phone), or a computer having a wireless communication function; or the terminal device may be a portable, pocket-sized, handheld, computer built-in, or in-vehicle mobile apparatus In some embodiments of the present disclosure, a network device is an apparatus that is deployed in a radio access network and that is used to provide a wireless communication function for a terminal device. The network device may be a base station, and the base station may include various types of macro base stations, micro base stations, relay nodes, and access points. In systems using different radio access technologies, names of terminal devices having a base station function may be different. For example, an evolved NodeB (eNB or eNodeB) in an LTE network is called a NodeB in a 3rd generation (3G) network, or a network device in a subsequent evolution communications system, but the use of the words does not constitute a restriction.

Figure 1:
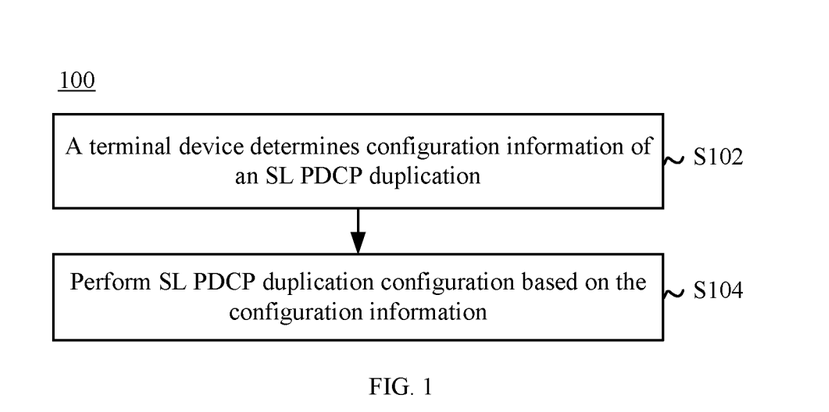
FIG. 1 is a schematic flowchart of a PDCP duplication configuration method according to an embodiment of the present disclosure.

As shown in FIG. 1, an embodiment of the present disclosure provides a PDCP duplication configuration method 100. The method may be performed by a terminal device. The terminal device mentioned in this embodiment may be specifically an SL sending terminal device, or may be an SL receiving terminal device. The SL sending terminal device may send data to the SL receiving terminal device based on an SL PDCP duplication. This embodiment includes the following steps.

S102. A terminal device determines configuration information of an SL PDCP duplication.

Figure 2:
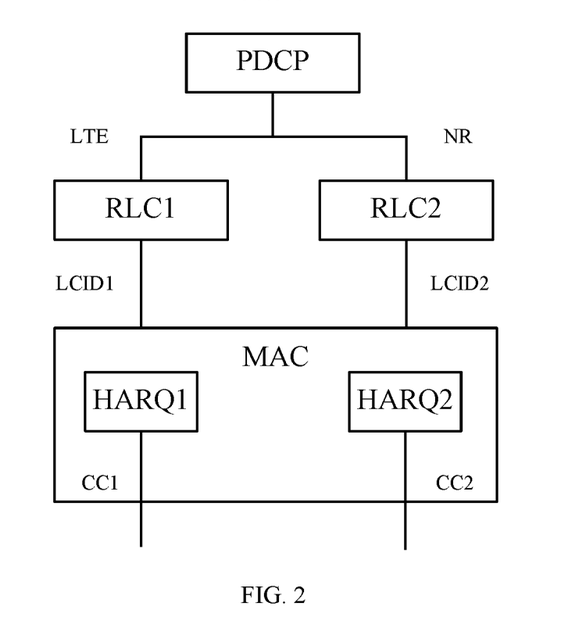
FIG. 2 is a schematic diagram of a specific application of a PDCP duplication configuration method according to an embodiment of the present disclosure.
Figure 3:
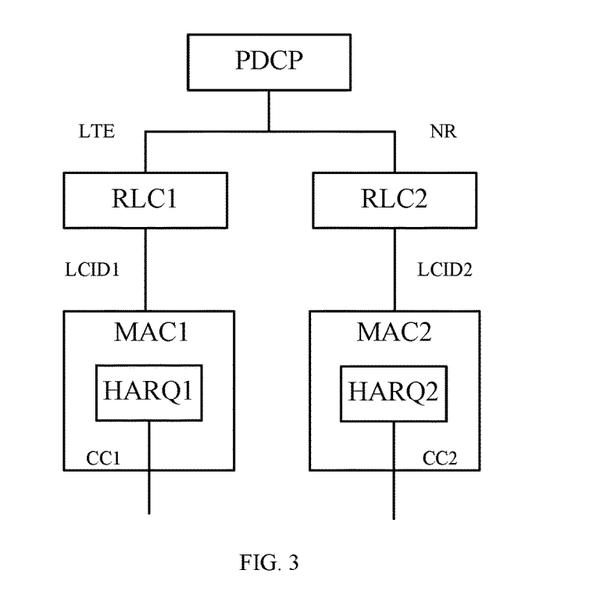
FIG. 3 is a schematic diagram of a specific application of a PDCP duplication configuration method according to another embodiment of the present disclosure.
Figure 4:
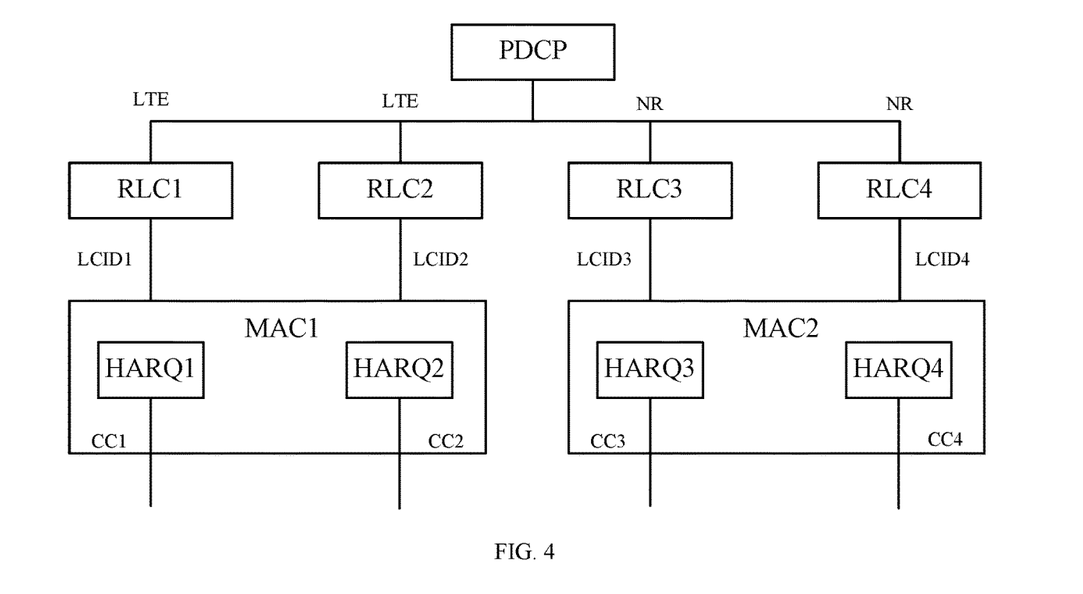
FIG. 4 is a schematic diagram of a specific application of a PDCP duplication configuration method according to still another embodiment of the present disclosure.

Optionally, the configuration information is mainly used to instruct the terminal device to perform SL PDCP duplication configuration, and may specifically include at least one of the following:

first configuration information used to instruct to activate or deactivate a PDCP duplication, where in a PDCP duplication deactivated state, the transmitting terminal device may send data by using an LTE sidelink or send data by using an NR sidelink;

second configuration information used to indicate a radio access technology used by a PDCP duplication, where LTE or NR may be specifically used, or one transmission branch of the PDCP duplication uses LTE, and another transmission branch of the PDCP duplication uses NR or the like;

third configuration information used to indicate a radio access technology used by a PDCP in a PDCP duplication, where LTE or NR may be specifically used, there is usually one PDCP entity, and a PDCP entity of LTE or a PDCP entity of NR may be specifically used;

fourth configuration information used to indicate a logical channel identifier (logical channel identifier, LCD) used by a PDCP duplication;

fifth configuration information used to indicate carrier information used by a PDCP duplication;

sixth configuration information used to indicate a quantity of transmission branches used by a PDCP duplication, where reference is made to subsequent embodiments shown in FIG. 2 to FIG. 4;

seventh configuration information used to indicate a transmission bandwidth part (Band Width Part, BWP) used by a PDCP duplication; and eighth configuration information used to indicate a transmission resource pool used by a PDCP duplication.

S104: Perform SL PDCP duplication configuration based on the configuration information.

Optionally, after performing SL PDCP duplication configuration based on the configuration information, the terminal device may transmit data based on the SL PDCP duplication. Specifically, the terminal device may transmit data by using at least two radio access technologies. For example, one transmission branch of a PDCP duplication uses LTE, and another transmission branch of the PDCP duplication uses NR.

Optionally, the terminal device may mainly transmit data based on the SL PDCP duplication through broadcast, multicast, unicast, or the like. Unicast is one-to-one (one to one) transmission. Multicast is one-to-many (one to many) transmission. Broadcast is also one-to-many transmission, but there is no concept that the SL receiving terminal device belongs to a same group. In addition, the SL receiving terminal device does not need to feed back a receiving status of the foregoing data.

According to the PDCP duplication configuration method provided in some embodiments of the present disclosure, the terminal device can determine the configuration information of the SL PDCP duplication, and perform SL PDCP duplication configuration based on the determined configuration information, to improve communication validity.

Optionally, the terminal device may be an SL sending terminal device, and
 the configuration information of the SL PDCP duplication may be sent by a network device, an SL resource scheduling terminal device, or an SL receiving terminal device to the SL sending terminal device; or
 the configuration information of the SL PDCP duplication is agreed upon by the SL sending terminal device and the SL receiving terminal device in advance.

Optionally, the terminal device may be an SL receiving terminal device, and
 the configuration information of the SL PDCP duplication may be sent by a network device, an SL resource scheduling terminal device, or an SL sending terminal device to the SL receiving terminal device; or
 the configuration information of the SL PDCP duplication is agreed upon by the SL sending terminal device and the SL receiving terminal device in advance.

Optionally, the configuration information does not include the first configuration information, and the configuration information may include at least one of the second configuration information to the eighth configuration information. In this embodiment, the SL PDCP duplication may always maintain an activated state.

In some embodiments of the present disclosure, regardless of whether the SL resource scheduling terminal device or the SL receiving terminal device sends the configuration information of the SL PDCP duplication to the SL sending terminal device, or the SL resource scheduling terminal device or the SL sending terminal device sends the configuration information of the SL PDCP duplication to the SL receiving terminal device, the configuration information of the SL PDCP duplication may be sent through broadcast, or sent by using a control channel, or sent by using a data channel.

The control channel, for example, includes a PSCCH, and the data channel, for example, includes a PSSCH.

For the transmission resource pool mentioned in the eighth configuration information in some embodiments of the present disclosure, the transmission resource pool may be sent or preconfigured by a network device, and the transmission resource pool includes a resource used for discovery or transmission and a transmission-related parameter, including an offset value of a first subframe of the resource pool, a bitmap corresponding to the resource pool, information indicating whether to transmit a physical sidelink control channel PSCCH) and a physical sidelink shared channel (PSSCH) on an adjacent resource block (RB), a quantity of sub-channels, a size of each sub-channel, a minimum RB index value corresponding to the sub-channel, a minimum RB index value corresponding to a PSCCH pool, an S-RSSI threshold of CBR measurement, an area identifier, and the like.

Currently, in addition to configuring a common transmission resource pool for the terminal device, the network device may configure an exceptional resource pool (exceptional pool). The exceptional resource pool is used in some special cases such as a switching process, a radio link failure (RLF), or a process of switching from an idle state (IDLE) to a connected state (CONNECTED).

In the foregoing embodiment, optionally, the configuration information of the SL PDCP duplication may be agreed upon in advance. For example, there is a mapping relationship between the configuration information of the SL PDCP duplication and at least one of a service attribute, a logical channel priority, a channel condition, or a capability of the transmitting terminal device. The following uses an example to describe the configuration information that is of the SL PDCP duplication and that is agreed upon in advance.

For example, for the first configuration information, it is agreed upon in advance that the SL PDCP duplication is always activated when data is being transmitted.

For another example, for the second configuration information, whether to use LTE or NR is determined according to a mapping rule. The mapping rule herein may be specifically related to at least one of the service attribute, the logical channel priority, the channel condition, and the capability of the SL sending terminal device/SL receiving terminal device.

For another example, for the third configuration information, whether to use the PDCP of LTE or the PDCP of NR is determined according to a mapping rule. The mapping rule herein may be specifically related to at least one of the service attribute, the logical channel priority, the channel condition, and the capability of the SL sending terminal device/SL receiving terminal device.

For another example, for the fourth configuration information, indication may be performed by reserving a logical channel identifier LCID. For example, an LCID 1 and an LCID 5 in an LTE system are used to perform SL PDCP duplication data transmission, and an LCID 2 and an LCID 5 in an NR system are used to perform SL PDCP duplication data transmission. In this case, it is agreed upon in advance that the LCID 2 in the NR system and the LCID 1 in the LTE system may be used to transmit same data, and the LCID 5 in the NR system and the LCID 5 in the LTE system may be used to transmit same data, or the like.

For another example, for the fifth configuration information, the carrier information of the SL PDCP duplication may be determined according to a mapping rule. The mapping rule herein may be specifically related to at least one of the service attribute, the logical channel priority, the channel condition, and the capability of the SL sending terminal device/SL receiving terminal device.

For another example, for the sixth configuration information, the quantity of transmission branches is determined based on the service attribute. Specifically, for example, when a service priority is relatively high, it is determined that the quantity of transmission branches is relatively large, to ensure correct reception by the SL receiving terminal device. When a service priority is relatively low, it is determined that the quantity of transmission branches is relatively small, to save transmission resources. It should be noted that both the relatively high priority and the relatively low priority are relative concepts.

For another example, for the seventh configuration information, the transmission BWP used by the PDCP duplication may be determined according to a mapping rule.

For another example, for the eighth configuration information, the transmission resource pool used by the PDCP duplication may be determined according to a mapping rule.

Optionally, the fourth configuration information includes at least two LCIDs. The at least two LCIDs are configured by a same Medium Access Control (MAC) entity, or the at least two LCIDs are configured by different MAC entities.

As shown in FIG. 2, an embodiment of the present disclosure provides a schematic diagram of a specific application of a PDCP duplication configuration method. In this embodiment, an SL PDCP duplication crosses two radio access technologies (cross RAT), that is, a first radio access technology and a second radio access technology. The first radio access technology may be specifically LTE, and the second radio access technology may be specifically NR.

Referring to FIG. 2, in this embodiment, a first logical channel LCID1 of the first radio access technology and a second logical channel LCID2 of the second radio access technology correspond to a same MAC entity.

Optionally, the first logical channel LCID1 and the second logical channel LCID2 are configured by the same MAC entity.

Optionally, a first hybrid automatic repeat request (HARQ) process of the first radio access technology and a second HARQ process of the second radio access technology are allocated by the same MAC entity.

In this embodiment, specifically, SLs of LTE and NR use a same MAC, that is, a logical channel LCID1 or HARQ process of LTE and a logical channel LCID2 or HARQ process of NR are allocated based on a unified LCD or a unified HARQ process. Logical channels or HARQs of different radio access technologies RAT may be mapped to different carriers. For details, refer to a CC1 and a CC2 in FIG. 2. In the figure, CC represents a component carrier.

In this embodiment, an SL sending terminal device performs a data replication function at a PDCP layer, and a replicated SL PDCP PDU is separately handed over to two different radio link control (RLC) entities. For details, refer to an RLC1 and an RLC2 in FIG. 2. Different RLC entities correspond to different logical channels, and different logical channels have different LCIDs. In FIG. 2, the RLC1 corresponds to the LCID1, and the RLC2 corresponds to the LCID2.

In addition, this embodiment does not support transmitting two replicated data packets on a same CC. Therefore, when processing replicated data from different logical channels, a Medium Access Control (MAC) layer needs to transmit the replicated data by using different HARQ entities. For details, refer to a HARQ1 and a HARQ2 in FIG. 2.

In some embodiments of the present disclosure, the configuration information of the SL PDCP duplication may be determined based on the embodiment shown in FIG. 1, and SL PDCP duplication configuration is performed based on the configuration information. To avoid repetition, a specific implementation process is not described again.

As shown in FIG. 3, another embodiment of the present disclosure provides a schematic diagram of a specific application of a PDCP duplication configuration method. In this embodiment, an SL PDCP duplication crosses two radio access technologies, that is, a first radio access technology and a second radio access technology. The first radio access technology may be specifically LTE, and the second radio access technology may be specifically NR.

Referring to FIG. 3, in this embodiment, a first logical channel LCID1 of the first radio access technology corresponds to a first MAC entity MAC1, and a second logical channel LCID2 of the second radio access technology corresponds to a second MAC entity MAC2.

Optionally, a first HARQ process of the first radio access technology corresponds to the first MAC entity MAC1, and a second HARQ process of the second radio access technology corresponds to the second MAC entity MAC2.

In this embodiment, the first MAC entity MAC1 and the second MAC entity MAC2 are different.

In this embodiment, specifically, SLs of LTE and NR use different MACs, that is, a logical channel LOD1 or HARQ process of LTE and a logical channel LCID2 or HARQ process of NR are allocated based on different MACs. Logical channels or HARQs of different RATs may be mapped to different carriers. For details, refer to a CC1 and a CC2 in FIG. 3. In the figure, CC represents a component carrier.

In this embodiment, an SL sending terminal device performs a data replication function at a PDCP layer, and a replicated SL PDCP PDU is separately handed over to two different radio link control (RLC) entities. For details, refer to an RLC1 and an RLC2 in FIG. 3. Different RLC entities correspond to different logical channels, and different logical channels have different LCIDs. In FIG. 3, the RLC1 corresponds to the LCID1, and the RLC2 corresponds to the LCID2.

In addition, this embodiment does not support transmitting two replicated data packets on a same CC, and a HARQ1 and a HARQ2 respectively correspond to different MAC entities: MAC1 and the MAC2 in FIG. 3, to ensure that the CC1 and the CC2 are different.

In some embodiments of the present disclosure, the configuration information of the SL PDCP duplication may be determined based on the embodiment shown in FIG. 1, and SL PDCP duplication configuration is performed based on the configuration information. To avoid repetition, a specific implementation process is not described again.

As shown in FIG. 4, an embodiment of the present disclosure provides a schematic diagram of a specific application of a PDCP duplication configuration method. In this embodiment, an SL PDCP duplication crosses two radio access technologies, that is, a first radio access technology and a second radio access technology. The first radio access technology may be specifically LTE, and the second radio access technology may be specifically NR.

Referring to FIG. 4, in this embodiment, the first radio access technology LTE includes two logical channels: an LCID1 and an LCID2 in FIG. 4, and the second radio access technology NR includes two logical channels: an LCID3 and an LCID4 in FIG. 4.

The LCID1 and the LCID2 correspond to a first MAC entity MAC1, and the LCID3 and the LCID4 correspond to the second MAC entity MAC2. The MAC1 and the MAC2 are different.

In this embodiment, an SL sending terminal device performs a data replication function at a PDCP layer, and a replicated SL PDCP PDU is separately handed over to four different radio link control (RLC) entities. For details, refer to an RLC1, an RLC2, an RLC3, and an RLC4 in FIG. 4. Different RLC entities correspond to different logical channels, and different logical channels have different LCIDs. In FIG. 4, the RLC1 corresponds to the LCID1, the RLC2 corresponds to the LCID2, the RLC3 corresponds to the LCID3, and the RLC4 corresponds to the LCID4.

In addition, this embodiment does not support transmitting two replicated data packets on a same CC, and a HARQ1, a HARQ2, a HARQ3, and a HARQ4 respectively correspond to different MAC entities: the MAC1 and the MAC2 in FIG. 4.

In some embodiments of the present disclosure, the configuration information of the SL PDCP duplication may be determined based on the embodiment shown in FIG. 1, and SL PDCP duplication configuration is performed based on the configuration information. To avoid repetition, a specific implementation process is not described again In this embodiment, there are two first logical channels of the first radio access technology, there are two second logical channels of the second radio access technology, and there are four transmission branches in this embodiment.

Optionally, in another embodiment, there is at least one first logical channel of the first radio access technology, and/or there is at least one second logical channel of the second radio access technology.

The foregoing describes in detail a PDCP duplication configuration method according to some embodiments of the present disclosure with reference to FIG. 1 to FIG. 4. A terminal device according to some embodiments of the present disclosure is described in detail below with reference to FIG. 5.

Figure 5:
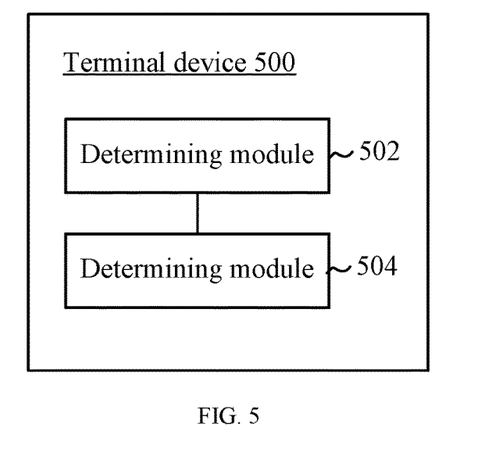
FIG. 5 is a schematic structural diagram of a terminal device according to an embodiment of the present disclosure.

FIG. 5 is a schematic structural diagram of a terminal device according to some embodiments of the present disclosure. The terminal device may be specifically an SL sending terminal device or may be an SL receiving terminal device. As shown in FIG. 5, a terminal device 500 includes:
  a determining module 502, which may be configured to determine configuration information of an SL PDCP duplication; and
  a configuration module 504, which may be configured to perform SL PDCP duplication configuration based on the configuration information.

According to the terminal device provided in some embodiments of the present disclosure, the configuration information of the SL PDCP duplication can be determined, and SL PDCP duplication configuration is performed based on the determined configuration information, to improve communication validity.

Optionally, in an embodiment, when the terminal device is an SL sending terminal device,
  the configuration information of the SL PDCP duplication is sent by a network device, an SL resource scheduling terminal device, or an SL receiving terminal device to the SL sending terminal device; or
  the configuration information of the SL PDCP duplication is agreed upon by the SL sending terminal device and the SL receiving terminal device in advance.

Optionally, in an embodiment, when the terminal device is an SL receiving terminal device,
  the configuration information of the SL PDCP duplication is sent by a network device, an SL resource scheduling terminal device, or an SL sending terminal device to the SL receiving terminal device; or
  the configuration information of the SL PDCP duplication is agreed upon by the SL sending terminal device and the SL receiving terminal device in advance.

Optionally, in an embodiment, the configuration information of the SL PDCP duplication includes at least one of the following:
  first configuration information used to instruct to activate or deactivate a PDCP duplication;

second configuration information used to indicate a radio access technology used by a PDCP duplication;
third configuration information used to indicate a radio access technology used by a PDCP in a PDCP duplication;
fourth configuration information used to indicate a logical channel identifier LCD used by a PDCP duplication;
fifth configuration information used to indicate carrier information used by a PDCP duplication;
sixth configuration information used to indicate a quantity of transmission branches used by a PDCP duplication;
seventh configuration information used to indicate a transmission bandwidth part BWP used by a PDCP duplication; and
eighth configuration information used to indicate a transmission resource pool used by a PDCP duplication.

Optionally, in an embodiment, the configuration information of the SLPDCP duplication is sent through broadcast, or sent by using a control channel, or sent by using a data channel.

Optionally, in an embodiment, that the determining module 502 determines configuration information of an SL PDCP duplication includes:
the terminal device determines the configuration information of the SLPDCP duplication based on at least one of a service attribute, a logical channel priority, and a channel condition.

Optionally, in an embodiment, the fourth configuration information includes at least two LCIDs, and
the at least two LCIDs are configured by a same MAC entity, or
the at least two LCIDs are configured by different MAC entities.

Optionally, in an embodiment, the SL PDCP duplication uses at least two radio access technologies.

Optionally, in an embodiment, the at least two radio access technologies include a first radio access technology and a second radio access technology, where
a first logical channel corresponding to the first radio access technology and a second logical channel corresponding to the second radio access technology are configured by a same MAC entity; and/or
a first HARQ process corresponding to the first logical channel and a second HARQ process corresponding to the second logical channel are configured by the same MAC entity.

Optionally, in an embodiment, the at least two radio access technologies include a first radio access technology and a second radio access technology, where
a first logical channel of the first radio access technology corresponds to a first MAC entity, and a second logical channel of the second radio access technology corresponds to a second MAC entity; and/or
a first HARQ process of the first radio access technology corresponds to the first MAC entity, and a second HARQ process of the second radio access technology corresponds to the second MAC entity, where
the first MAC entity is different from the second MAC entity.

Optionally, in an embodiment, there is at least one first logical channel, and/or there is at least one second logical channel.

For the terminal device 500 according to some embodiments of the present disclosure, reference may be made to the corresponding procedure of the method 100 according to some embodiments of the present disclosure, and each unit/module in the terminal device 500 and the foregoing other operations and/or functions are used to implement the corresponding procedure of the method 100. For brevity, details are not described herein again.

Figure 6:
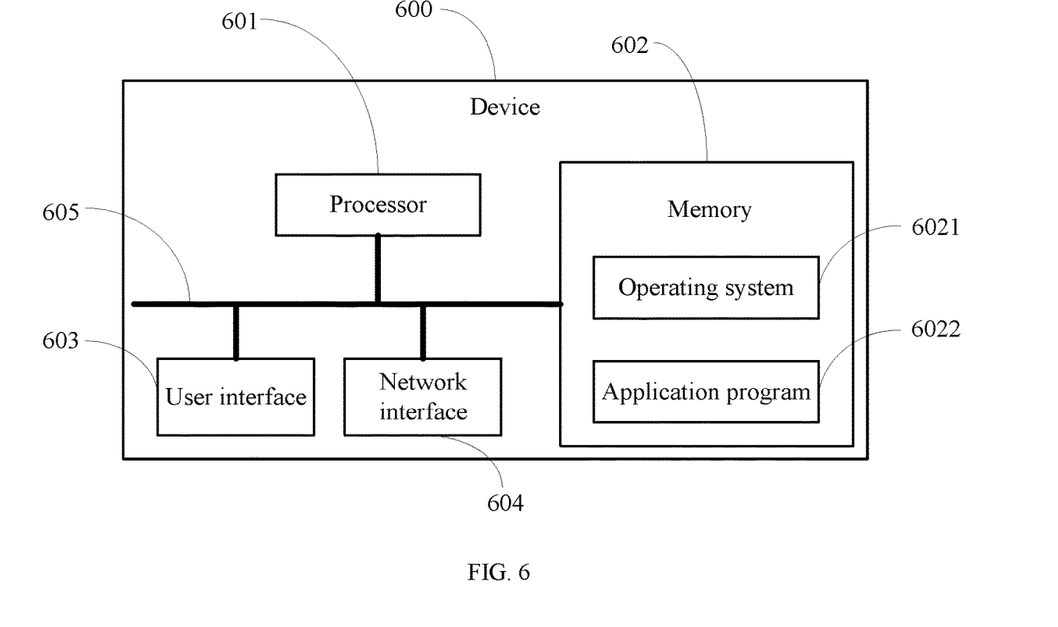
FIG. 6 is a schematic structural diagram of a terminal device according to another embodiment of the present disclosure.

FIG. 6 is a block diagram of a terminal device according to another embodiment of the present disclosure. As shown in FIG. 6, the terminal device 600 includes: at least one processor 601, a memory 602, at least one network interface 604, and a user interface 603. Various components of the terminal device 600 are coupled by using the bus system 605. It can be understood that the bus system 605 is configured to implement connection and communication between these components. In addition to a data bus, the bus system 605 may include a power bus, a control bus, and a status signal bus. However, for clarity of description, various buses are marked as the bus system 605 in FIG. 6.

The user interface 603 may include a display, a keyboard, or a clicking terminal device, for example, a mouse, a trackball, a touch panel, or a touchscreen.

It may be understood that the memory 602 in some embodiments of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory DDRSDRAM), an enhanced synchronous dynamic random access memory (ESDRAM), a synchlink dynamic random access memory (SLDRAM), and a direct rambus random access memory (DRRAM). The memory 602 in the system and the method described in some embodiments of the present disclosure is intended to include, but is not limited to, these memories and memories of any other proper type.

In some implementations, the memory 602 stores the following element: an executable module or a data structure, a subset thereof, or an extended set thereof: an operating system 6021 and an application program 6022.

The operating system 6021 includes various system programs, for example, a framework layer, a kernel library layer, and a driver layer, and is configured to implement various basic services and process hardware-based tasks. The application program 6022 includes various application programs, for example, a media player and a browser, and is configured to implement various application services. A program for implementing the method in some embodiments of the present disclosure may be included in the application program 6022.

In some embodiments of the present disclosure, the terminal device 600 further includes: a computer program stored in the memory 602 and executable on the processor 601. When the computer program is executed by the processor 601, the steps in the foregoing method embodiment 100 are performed.

The methods disclosed in some embodiments of the present disclosure may be applied to the processor 601 or implemented by the processor 601. The processor 601 may be an integrated circuit chip having a signal processing capability. During implementation, the steps of the foregoing method can be completed by hardware integrated logic circuits in the processor 601 or instructions in the form of software. The foregoing processor 601 may be a general-purpose processor, a digital signal processor (DSP), an application-specific integrated circuit (ASIC), a field programmable gate array (FPGA) or another programmable logic component, a discrete gate or a transistor logic component, or a discrete hardware component. The processor 601 may implement or execute the methods, steps, and logic block diagrams disclosed in some embodiments of the present disclosure. The general-purpose processor may be a microprocessor or may be any conventional processor or the like. The steps of the method disclosed in some embodiments of the present disclosure may be directly performed by a hardware decoding processor or by a combination of hardware and software modules in the decoding processor. The software module may be located in a mature computer-readable storage medium in this field such as a random access memory, a flash memory, a read-only memory, a programmable read-only memory or an electrically erasable programmable memory, or a register. The computer-readable storage medium is located in the memory 602, and the processor 601 reads information from the memory 602 and completes the steps of the foregoing method in combination with its hardware. Specifically, the computer-readable storage medium stores a computer program, and when the computer program is executed by the processor 601, the steps of the foregoing method embodiment 100 are performed.

It can be understood that those embodiments described in some embodiments of the present disclosure can be implemented with hardware, software, firmware, middleware, microcode, or a combination thereof. For implementation with hardware, the processing unit can be implemented in one or more application-specific integrated circuits (ASICs), digital signal processors (DSPs), digital signal processing terminal devices (DSP Devices, DSPDs), programmable logic devices (PLDs), field-programmable gate arrays (FPGAs), general-purpose processors, controllers, microcontrollers, microprocessors, and other electronic units or a combination thereof used to perform the functions described in this application.

For implementation with software, the technology described in some embodiments of the present disclosure may be implemented by executing functional modules (for example, a process and a function) described in some embodiments of the present disclosure. Software codes can be stored in the memory and executed by the processor. The memory can be implemented inside or outside the processor.

The terminal device 600 can implement each process implemented by the terminal device in the foregoing embodiments. To avoid repetition, details are not described herein again.

Some embodiments of the present disclosure further provide a computer-readable storage medium. The computer-readable storage medium stores a computer program, and when the computer program is executed by a processor, the processes in the foregoing method embodiment 100 are implemented, and a same technical effect can be achieved. To avoid repetition, details are not described herein again. The computer-readable storage medium may be a read-only memory (ROM), a random access memory (RAM), a magnetic disk, a compact disc, or the like.

It should be noted that, in this specification, the terms "include", "comprise", or their any other variant are intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or a compact disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A packet data convergence protocol PDCP duplication configuration method, comprising:
    determining, by a terminal device, configuration information of a sidelink SL PDCP duplication; and
    performing, by the terminal device, SL PDCP duplication configuration based on the configuration information,
    wherein the determining, by a terminal device, configuration information of an SL PDCP duplication comprises:
    determining, by the terminal device, the configuration information of the SL PDCP duplication based on only a service attribute, a logical channel priority, and a channel condition,
    wherein the configuration information of the SL PDCP duplication comprises:
    sixth configuration information used to indicate a quantity of transmission branches used by a PDCP duplication, wherein the quantity of transmission branches is a total quantity of logical channels of at least two radio access technologies used by the SL PDCP duplication; and
    seventh configuration information used to indicate a transmission bandwidth part BWP used by a PDCP duplication.

2. The method according to claim 1, wherein when the terminal device is an SL sending terminal device,
    the configuration information of the SL PDCP duplication is sent by a network device, an SL resource scheduling terminal device, or an SL receiving terminal device to the SL sending terminal device; or
    the configuration information of the SL PDCP duplication is agreed upon by the SL sending terminal device and the SL receiving terminal device in advance.

3. The method according to claim 1, wherein when the terminal device is an SL receiving terminal device, the configuration information of the SL PDCP duplication is sent by a network device, an SL resource scheduling terminal device, or an SL sending terminal device to the SL receiving terminal device; or the configuration information of the SL PDCP duplication is agreed upon by the SL sending terminal device and the SL receiving terminal device in advance.

4. The method according to claim 1, wherein the configuration information of the SL PDCP duplication further comprises at least one of the following:

first configuration information used to instruct to activate or deactivate a PDCP duplication;

second configuration information used to indicate a radio access technology used by a PDCP duplication;

third configuration information used to indicate a radio access technology used by a PDCP in a PDCP duplication;

fourth configuration information used to indicate a logical channel identifier LCD used by a PDCP duplication;

fifth configuration information used to indicate carrier information used by a PDCP duplication;

eighth configuration information used to indicate a transmission resource pool used by a PDCP duplication.

5. The method according to claim 1, wherein the configuration information of the SL PDCP duplication is sent through broadcast, or sent by using a control channel, or sent by using a data channel.

6. The method according to claim 4, wherein the fourth configuration information comprises at least two LCIDs, and the at least two LCIDs are configured by a same MAC entity, or the at least two LCIDs are configured by different MAC entities.

7. The method according to claim 1, wherein the at least two radio access technologies comprise a first radio access technology and a second radio access technology, wherein a first logical channel corresponding to the first radio access technology and a second logical channel corresponding to the second radio access technology are configured by a same MAC entity; and/or a first hybrid automatic repeat request HARQ process corresponding to the first logical channel and a second HARQ process corresponding to the second logical channel are configured by the same MAC entity.

8. The method according to claim 1, wherein the at least two radio access technologies comprise a first radio access technology and a second radio access technology, wherein a first logical channel of the first radio access technology corresponds to a first MAC entity, and a second logical channel of the second radio access technology corresponds to a second MAC entity; and/or a first HARQ process of the first radio access technology corresponds to the first MAC entity, and a second HARQ process of the second radio access technology corresponds to the second MAC entity, wherein the first MAC entity is different from the second MAC entity.

9. The method according to claim 8, wherein
there is at least one first logical channel; and/or
there is at least one second logical channel.

10. A terminal device, comprising: a memory, a processor, and a computer program that is stored in the memory and that can run on the processor, wherein when the computer program is executed by the processor, following steps are implemented:

determining configuration information of a sidelink SL PDCP duplication; and performing SL PDCP duplication configuration based on the configuration information, wherein when the computer program is executed by the processor, a following step is further implemented:

determining the configuration information of the SL PDCP duplication based on only a service attribute, a logical channel priority, and a channel condition, wherein the configuration information of the SL PDCP duplication comprises:

sixth configuration information used to indicate a quantity of transmission branches used by a PDCP duplication, wherein the quantity of transmission branches is a total quantity of logical channels of at least two radio access technologies used by the SL PDCP duplication; and seventh configuration information used to indicate a transmission bandwidth part BWP used by a PDCP duplication.

11. The terminal device according to claim 10, wherein when the terminal device is an SL sending terminal device, the configuration information of the SL PDCP duplication is sent by a network device, an SL resource scheduling terminal device, or an SL receiving terminal device to the SL sending terminal device; or the configuration information of the SL PDCP duplication is agreed upon by the SL sending terminal device and the SL receiving terminal device in advance.

12. The terminal device according to claim 10, wherein when the terminal device is an SL receiving terminal device, the configuration information of the SL PDCP duplication is sent by a network device, an SL resource scheduling terminal device, or an SL sending terminal device to the SL receiving terminal device; or the configuration information of the SL PDCP duplication is agreed upon by the SL sending terminal device and the SL receiving terminal device in advance.

13. The terminal device according to claim 10, wherein the configuration information of the SL PDCP duplication further comprises at least one of the following:

first configuration information used to instruct to activate or deactivate a PDCP duplication;

second configuration information used to indicate a radio access technology used by a PDCP duplication;

third configuration information used to indicate a radio access technology used by a PDCP in a PDCP duplication;

fourth configuration information used to indicate a logical channel identifier LCD used by a PDCP duplication;

fifth configuration information used to indicate carrier information used by a PDCP duplication;

eighth configuration information used to indicate a transmission resource pool used by a PDCP duplication.

14. The terminal device according to claim 10, wherein the configuration information of the SL PDCP duplication is sent through broadcast, or sent by using a control channel, or sent by using a data channel.

15. The terminal device according to claim 13, wherein the fourth configuration information comprises at least two LCIDs, and the at least two LCIDs are configured by a same MAC entity, or the at least two LCIDs are configured by different MAC entities.

16. A non-transitory computer-readable storage medium, wherein the non-transitory computer-readable storage medium stores a computer program, and when the computer program is executed by a processor, following steps are implemented:

determining configuration information of a sidelink SL PDCP duplication; and performing SL PDCP duplication configuration based on the configuration information, wherein when the computer program is executed by the processor, a following step is further implemented:

determining the configuration information of the SL PDCP duplication based on only a service attribute, a logical channel priority, and a channel condition, wherein the configuration information of the SL PDCP duplication comprises:

sixth configuration information used to indicate a quantity of transmission branches used by a PDCP duplication, wherein the quantity of transmission branches is a total quantity of logical channels of at least two radio access technologies used by the SL PDCP duplication; and seventh configuration information used to indicate a transmission bandwidth part BWP used by a PDCP duplication.

* * * * *